June 12, 1962    R. H. MERRICK    3,038,321
ABSORPTION REFRIGERATION SYSTEM
Filed July 7, 1958
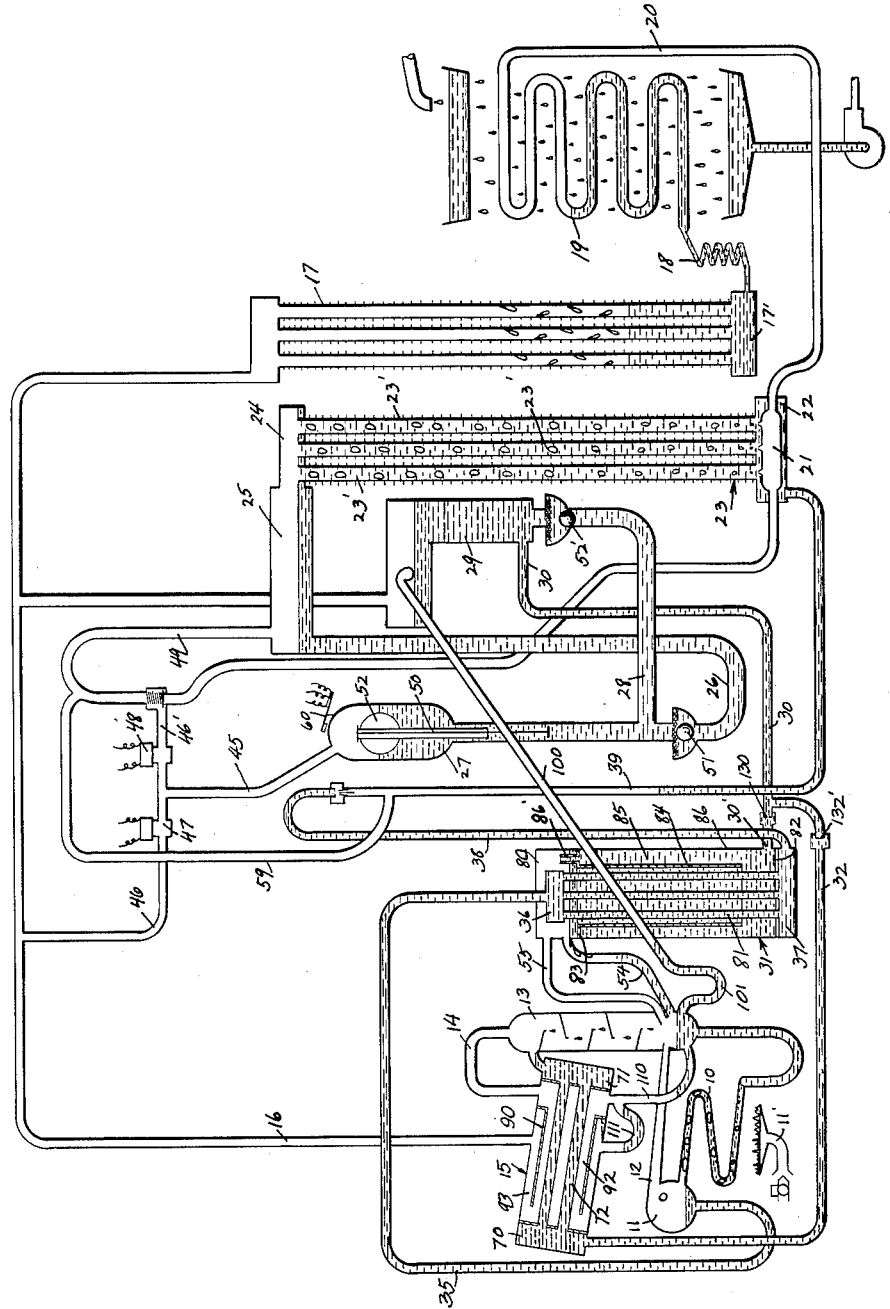
INVENTOR.
Richard H. Merrick
BY
Herman Seid
atty.

3,038,321
ABSORPTION REFRIGERATION SYSTEM
Richard H. Merrick, Tyler, Tex., assignor to Carrier Corporation, Syracuse, N.Y., a corporation of Delaware
Filed July 7, 1958, Ser. No. 746,705
9 Claims. (Cl. 62—495)

This invention relates broadly to absorption refrigeration systems employing a refrigerant and an absorbent. More particularly this invention relates to improvement in the solution circuit of absorption refrigeration systems.

In equipment employing an absorption refrigeration system, there are provisions made for the movement of a solution of refrigerant and absorbent through a path between the absorber and generator referred to as the solution circuit. The solution passing from the generator to the absorber is passed in heat transfer relation with the solution flowing from the absorber to the generator.

It is the chief object of this invention to provide an arrangement for more efficiently transferring heat within the solution circuit, and for utilizing relatively cool solution available in portions of the solution circuit for purifying the vaporous products of the generator to the extent that the portion of vapor flowing from the generator that includes the absorbent in gaseous form is condensed to render the remaining vapor substantially pure refrigerant gas.

Another object of the invention involves an arrangement providing more efficient transfer of heat between solution flowing in the solution circuit and the gaseous products flowing from the generator.

A further object of the invention involves the provision of an arrangement utilizing solution flowing in the solution circuit to condense portions of the absorbent vapor flowing from the generator to render the remaining vapor substantially free of absorbent vapor. A portion of the condensate, so formed, is then employed in a trap construction to prevent vapor flowing from the generator from bypassing all or a portion of the heat exchange assembly.

Another object of the invention is the provision of an improved heat transfer unit, normally referred to as an analyzer for the purpose of condensing portions of the absorbent flowing in vapor form from the generator in the gaseous mixture comprising refrigerant vapor and absorbent vapor.

A further object is the provision of an improved heat transfer unit normally referred to as a rectifier, for the purpose of further purifying the gaseous products of the generator, arranged to cooperate with the analyzer to drain condensate formed in the rectifier so that it may be readily transferred to the solution returning to the generator from the absorber.

Other objects and features of the invention will be evident upon a consideration of the ensuing specification and drawing in which:

The FIGURE is a schematic view of an absorption refrigeration system embodying the invention.

Attention is directed to the figure wherein a schematic representation of an absorption refrigeration system is shown. This system chosen to illustrate but not limit this invention, utilizes a solution of water and ammonia with water as the absorbent and ammonia as the refrigerant. As is conventional in equipment of this particular nature, the system embodies a solution circuit and a refrigerant circuit. The solution circuit provides a path of flow for solution between the generator and the absorber. Solution which has collected in generator 10 is heated through the operation of burner 11' supplied with gas in a supply line under the control of a valve. When heat is applied to the solution in the generator, portions of the solution boil off in the form of vapor which travels upwardly through the generator. A mixture of liquid and gas flows into a separation chamber 11 where the gaseous portion of the mixture, which includes both water and ammonia vapor, flows through line 12 to the analyzer 13. The solution in liquid form remaining in separation chamber 11 has a relatively high concentration of absorbent or water therein so it has strong absorbing properties. It is therefore referred to as strong solution.

The vaporous mixture flowing in the analyzer 13 is subjected to a heat transfer action with solution flowing in the solution circuit in a manner later to be described. The heat transfer action occurring in the analyzer 13 causes portions of the water vapor flowing in the gaseous mixture to condense out in the solution which flows by gravity to the bottom of the analyzer. At the same time portions of ammonia vaporize from the solution circuit and join with the mixture flowing through line 14 to the rectifier 15.

In the rectifier 15 an additional heat transfer action occurs rendering the vaporous mixture substantially free of water vapor so that the vapor flowing in line 16 to the condenser 17 is substantially pure ammonia or refrigerant vapor.

In the condenser 17 the refrigerant vapor is condensed as air or some other cooling medium is routed over the surface of the condenser under the influence of a fan, not shown. The liquid refrigerant collects in the lower portion 17' of the condenser and flows through capillary 18 to the evaporator 19.

In the evaporator 19, heat is extracted from some medium such as water forming a portion of the chilled water circuit for the purpose of providing cooled water to a coil serving as part of an air conditioning system. The vaporous refrigerant created in evaporator 19 flows through line 20 to the vapor header 21 in the absorber 23.

Preferably the absorber 23 consists of a lower solution header 22 accommodating strong solution flowing from the generator. An upper header 24 is connected to the lower header 22 by a series of parallel spaced vertical tubes 23'. Strong solution flows upwardly through the tubes and absorbs vapor from the header 21 as the vapor escapes through openings provided in the vapor header 21 in alignment with the individual tubes 23'. The heat due to the absorption action is dissipated by air or other medium through the operation of a fan, not shown. In the absorber the strong solution absorbs vapor in the manner described above and flows upwardly so that the characteristics of the solution at the top of the header 24 cause it to be termed weak solution. In other words, the concentration of ammonia in the solution at the top header of the absorber is such that its absorbing characteristics are weak. The weak solution overflows from the header 24 into a low side reservoir 25.

Transfer of the weak solution from the low side reservoir 25 back to the generator is accomplished with the aid of a solution transfer vessel. The solution transfer vessel together with its operating mechanism forms the subject of a co-pending application Serial No. 746,834, filed July 7, 1958, in my name and the name of Richard A. English, and assigned to the assignee of this invention. Briefly the solution transfer vessel is arranged with respect to the low side reservoir 25 so that when the interior of the solution transfer vessel is equalized to pressure in the low side of the system through lines 45, 46' and 49, weak solution that has collected in the low side reservoir 25 flows by gravity through line 26 into the solution transfer vessel 27. Located within this solution transfer vessel 27 is a float 52. The float is arranged so that it carries with it a switch actuating member 50 as it rises within the vessel. The switch actuating member 50 is provided with a top portion formed of magnetic material. As the float 52 rises within the vessel 27 the switch actuating member 50 attracts one end of a lever 60 provided likewise with a magnetic material. The magnetic attraction causes the lever 60 to pivot in a counter-clockwise direction. This has the effect of causing a circuit to be completed through a capsule of mercury carried on the other end of lever 60. Upon completion of the circuit described, solenoid valve 48 which has previously been opened in order to equalize the interior of the vessel with the low side of the refrigeration system is closed and solenoid valve 47 controlling communication between the high side of the refrigeration system through line 46 is opened. Thus the interior of the vessel is now, through lines 46, and 16, subjected to the high pressure side of the refrigeration system, particularly high side reservoir 29. Under these circumstances the solution which has collected in vessel 27 is free to flow by gravity to high side reservoir 29. A check valve 51 located in line 26 prevents the flow of solution through the line 26. Solution thus flows through line 28 past check valve 52' into the high side reservoir 29. From the high side reservoir the solution is free to flow through line 30 either in branch line 32 or branch line 30'.

This invention is more particularly related to the manner in which a solution flowing in lines 32 and 30' is utilized to cause a transfer of heat within the system sufficient to improve the operating characteristics of the system.

In considering first the flow of weak solution to the branch line 32, it will be apparent that line 32 connects with header 70 of the rectifier 15. The head 70 connects with a second header 71 in rectifier 15 through a series of tubular members 72. The tubular members provide a series of confined passages for the flow of weak solution through the rectifier. From the header 71, weak solution is introduced into the top of the analyzer 13 for flow down a series of the shelves extending from opposite sides of the analyzer. In the bottom portion of the analyzer the weak solution collects and is transmitted by gravity to the generator 10.

Weak solution flowing in line 30' enters solution heat exchanger 31 flowing upwardly therethrough in a manner later to be described. Line 54 accommodates liquid solution which is passed through the heat exchanger and connects with the lower portion of the analyzer for the purpose of collecting weak solution for transmittal to the generator. Any portions of the solution flowing in the solution heat exchanger which may have vaporized in the heat exchanger flow through line 55 which likewise connects with the analyzer preferably at the base of the tower portion.

In order to prevent an excessive accumulation of liquid solution in outlet reservoir of the solution transfer device which would slow down its return rate, line 100 is positioned with one end in communication with the solution transfer device outlet reservoir 29 in the manner shown and the other end in communication with the lower portion of the analyzer 13. Line 100 is provided with a trap portion 101 serving as a liquid seal or gas trap whichever term may be desired.

The strong solution which has collected in the chamber 11 flows through line 35 to solution heat exchanger 31. From the solution heat exchanger the strong solution collects in a lower header 37 and flows through lines 38 and 39 to the lower header 22 of the absorber 23. In the interest of promoting more efficient absorption action, line 59 is provided connecting line 49 and line 39. The purpose of line 59 is to provide a path of flow for vapor which may have passed through the absorber unabsorbed. This line connects with solution line 39 leading to the generator so that absorption action may take place in this line 39. This particular arrangement serves as the subject of patent application, Serial No. 746,777, filed July 7, 1958, in the name of Joseph Bourne, and assigned to the assignee of this invention.

Considering the construction of the solution heat exchanger it will be observed that there is an upper chamber 80 wherein the strong solution distributing header 36 is located. Strong solution flowing from the line 35 collects in the distributing header and is caused to pass to the lower header 37 through a series of tubular members 81. A lower partition 82 serves to mount the tubular members 81, while upper partition 83 serves to define the lower extremity of the chamber 80. An annular wrapper member 84 extends downwardly from the upper partition 83 and terminates short of the lower partition 82. The wrapper 84 defines with casing 86 an annular space 85 which is vented to the upper chamber 80 through pipe 86' mounted in partition 83. The purpose of pipe 86' is to relieve pressure which may build up as solution flowing through line 30' to the heat exchanger builds up therein.

As indicated above strong solution which collects in distributing chamber 36 flows through the individual tubes 81 and collects in the lower chamber 37. Flowing in heat transfer relation therewith is weak solution entering the heat exchanger at the connection between line 30' and the lower portion of the heat exchanger. The parts are so arranged that the weak solution tends to flow upwardly through the area defined by wrapper 84 in close intimate heat exchange relation with the tubular members 81. The weak solution flowing through the passages described above collects in the upper chamber 80 and flows through line 54 to the analyzer 13. Those portions of the weak solution which may have been vaporized during passage of the weak solution through the heat exchanger flow via line 55 to the analyzer 13.

Considering the heat transfer action occurring between the vaporous products of the generator and the solution which flows through the rectifier and the analyzer 13, it will be appreciated that the solution flowing through line 32 is relatively cool. The rectifier 15 is arranged so that the central axis is slightly inclined with respect to horizontal. Vapor flowing from the analyzer 13 enters the rectifier through the connection between the rectifier and line 14. An annular baffle member 90 is arranged within the rectifier 15 so that its upper end terminates short of the connection between the tubes 72 and the header 70. The lower portion of the baffle 90 connects to the side wall of the rectifier 15, defining therewith a first chamber 92 where the vapor flowing in line 14 initially enters the rectifier 15. As the vapor collects in the chamber 92 it flows upwardly around the tubular member 72 to an outer chamber 93 defined by the sides of the rectifier 15 and the annular baffle members 90.

Thus the rectifier 15 is arranged so that actually two heat transfer actions occur; the first in the area defined by the annular partitional wall 90 and the tubes 72 and the second in the area defined by the annular partition 90 and the outer wall of the rectifier 15. In the latter chamber 93, the cooling medium is the ambient.

The rectifier is so arranged that condensate, which occurs as portions of the water vapor flowing in the vapor mixture entering the rectifier condense out, flows in counter-flow relation to the vapor so as to improve heat transfer. The condensate formed by virtue of the heat transfer action occurring within the chamber defined by the annular partition 90 and the tubes 72 gravitates to the lower right hand side of the chamber 92 and flows via line 110 from the rectifier. The portion of the condensate which collects by virtue of the heat transfer action occurring in chamber 93 flows via line 111 to line 110. Line 110 connects with the lower portion of the analyzer so as to provide a path to the analyzer for the condensate formed within the rectifier. From the analyzer, of course, the solution joins with solution which collects in the lower portion of the analyzer and is transmitted by gravity to the generator 10. Lines 111 and 110 are provided with trap portions in order to prevent the vapor flowing from line 14 from bypassing either the space between tubes 72 and the annular partition wall 90 or the rectifier completely.

Line 100 prevents the collection of an abnormal supply of weak solution in the reservoir 29. The trap 101 prevents flow of vapor or gas between the analyzer and the reservoir. Such flow would, of course, enable the gas to by-pass the condenser and the evaporator resulting in a loss in the system. Orifices 130, 132 are employed to even out the flow. It will be obvious that the size of the orifices will determine the percentage of flow in either branch line.

It thus will be observed that by virtue of the construction described a complete and efficient transfer of heat of the type which renders the vapor flowing in line 16 substantially free of water is provided.

While I have described preferred embodiments of the invention, it will be understood the invention is not limited thereto since it may be otherwise embodied within the scope of the following claims:

I claim:

1. In an absorption refrigeration system, the combination including a generator, a condenser, an evaporator and an absorber, means for transmitting a solution of refrigerant and absorbent between the absorber and the generator, and means for transferring heat between the gaseous products emanating from the generator and solution flowing to the generator from the absorber, said last mentioned means including an analyzer having a first portion for collecting solution for supply to the generator and a tower portion equipped with shelves providing a path for the flow of gas products from the generator and a path of flow for solution along said shelves so that a transfer of heat occurs between the fluids, a rectifier arranged to provide an inclined flow path for gas products emanating from the analyzer, said rectifier including confined passages for the flow of solution in the solution circuit upstream of the analyzer in heat transfer relation with the gas in the rectifier, and means connecting the rectifier and the solution collection portion of the analyzer to provide a path of flow for condensate, formed in the rectifier, to the analyzer whereby condensate bypasses the tower portion of the analyzer.

2. In an absorption refrigeration system, the combination including a generator, a condenser, an evaporator, and an absorber, means for transmitting a solution of refrigerant and absorbent between the absorber and the generator, and means for transferring heat between the gaseous products emanating from the generator and solution flowing to the generator from the absorber, said last mentioned means including an analyzer having a first portion for collecting solution for supply to the generator and a tower portion equipped with shelves providing a path for the flow of gas products from the generator and a path of flow for solution along said shelves so that a transfer of heat occurs between the fluids, a rectifier forming an inclined path for the flow of solution through said rectifier and including means forming a chamber for receiving gaseous fluid flowing from the analyzer, means forming a second chamber for transmitting gaseous fluid to the condenser, means forming a path connecting said first and second chambers for guiding gaseous fluid in heat transfer relation to the flow of solution through the rectifier, and means connecting the rectifier and the solution collection portion of the analyzer to provide a path of flow for condensate, formed in the rectifier to the analyzer whereby condensate bypasses the tower portion of the analyzer.

3. The invention set forth in claim 2 wherein said last mentioned means includes a line for draining condensate collecting in said first chamber to the solution collection portion of said analyzer.

4. The invention set forth in claim 2 wherein said last mentioned means includes a trap for preventing flow of gaseous fluid from said first chamber to the analyzer.

5. The invention set forth in claim 2 wherein said last mentioned means includes a line connecting the first chamber and the analyzer and a second line connecting said second chamber and the last-mentioned line.

6. The invention set forth in claim 5 wherein said second line is formed with a trap portion to prevent passage of gaseous fluid from the first chamber directly to the second chamber.

7. In an absorption refrigeration system including an absorber, a generator, a condenser and an evaporator, means for transmitting solution from the absorber to the generator, reservoir means in communication with the high pressure side of the system for receiving solution from the solution transmission means for supply to the generator, an analyzer connected to the generator for receiving gaseous products therefrom, said analyzer being provided with an opening for receiving solution flowing from the reservoir means to the generator and means for directing flow of the solution in heat transfer relation with the gaseous products flowing from the generator, and overflow means connecting the analyzer and the solution collection means.

8. The invention set forth in claim 7 wherein said overflow means includes a trap for the purpose of preventing flow of gaseous products between the analyzer and the reservoir means.

9. In an absorption refrigeration system including an absorber, a generator, a condenser and an evaporator, means forming a circuit for the flow of solution between the absorber and generator, a heat transfer unit interposed in said circuit including tubular members forming a plurality of confined paths for the solution flowing to the absorber, a casing surrounding the tubular members, a lower partition and an upper partition in the casing, the tubular members being arranged to terminate in said lower partition and extend through the upper partition, and an annular baffle, surrounding the tubular members depending from the upper partition for promoting flow of solution from the absorber upwardly through the casing in heat transfer relation with the tubular members.

References Cited in the file of this patent

UNITED STATES PATENTS

| | | |
|---|---|---|
| 810,670 | Prellwitz | Jan. 23, 1906 |
| 1,949,157 | Fuller | Feb. 27, 1934 |
| 1,960,809 | Dahlgren | May 29, 1934 |
| 2,201,362 | Bergholm | May 21, 1940 |
| 2,238,138 | Taylor | Apr. 15, 1941 |
| 2,278,661 | Lenning et al. | Apr. 7, 1942 |
| 2,329,863 | Thomas | Sept. 21, 1943 |
| 2,544,885 | Jacoby | Mar. 13, 1951 |
| 2,685,781 | Simpson | Aug. 10, 1954 |